United States Patent [19]

Shiki et al.

[11] 4,384,358

[45] May 17, 1983

[54] SPACE-DIVERSITY BROAD-BAND DIGITAL RADIO RECEIVER

[75] Inventors: Haruo Shiki; Toru Ohmori, both of Tokyo, Japan

[73] Assignee: Nippon Electric Co., Ltd., Tokyo, Japan

[21] Appl. No.: 228,841

[22] Filed: Jan. 27, 1981

[30] Foreign Application Priority Data

Jan. 28, 1980 [JP] Japan .................................... 55-8556
Jul. 7, 1980 [JP] Japan .................................. 55-92531

[51] Int. Cl.³ .......................................... H04B 15/00
[52] U.S. Cl. .................................. 375/100; 375/102; 455/137; 455/296
[58] Field of Search ...................... 375/38, 40, 14, 100, 375/102; 455/132, 137, 138, 139, 296; 371/68

[56] References Cited

U.S. PATENT DOCUMENTS 3,195,049 7/1965 Altman et al. ...................... 455/139
3,302,115 1/1967 Shiki ..................................... 455/135
3,348,152 10/1967 Laughlin ............................. 455/139
3,879,664 4/1975 Monsen ............................... 455/138

Primary Examiner—Benedict V. Safourek
Assistant Examiner—Sephen Chin
Attorney, Agent, or Firm—Sughrue, Mion, Zinn, Macpeak and Seas

[57] ABSTRACT

In order to reduce bit errors resulting in a space-diversity broad-band digital radio receiver from selective fading, an amplitude dispersion detector detects the amplitude dispersion caused, if any, by the selective fading in each of IF signals produced by the space-diversity reception and produces a detector output having an amplitude variable with the detected amplitude dispersion and used in combining the IF signals. The detector may comprise three band-pass filters having different narrow passbands in the IF band to produce filter outputs with amplitudes dependent on first-order and second-order dispersion components of the amplitude dispersion. Alternatively, the detector may comprise a band-pass filter having a narrow passband repeatedly variable throughout the IF band at a lower frequency to produce a filter output with an amplitude variable with the first-order and the second-order dispersion components and, above all, with a notch-shaped dispersion component.

7 Claims, 13 Drawing Figures

FIG. 3
FIG. 11
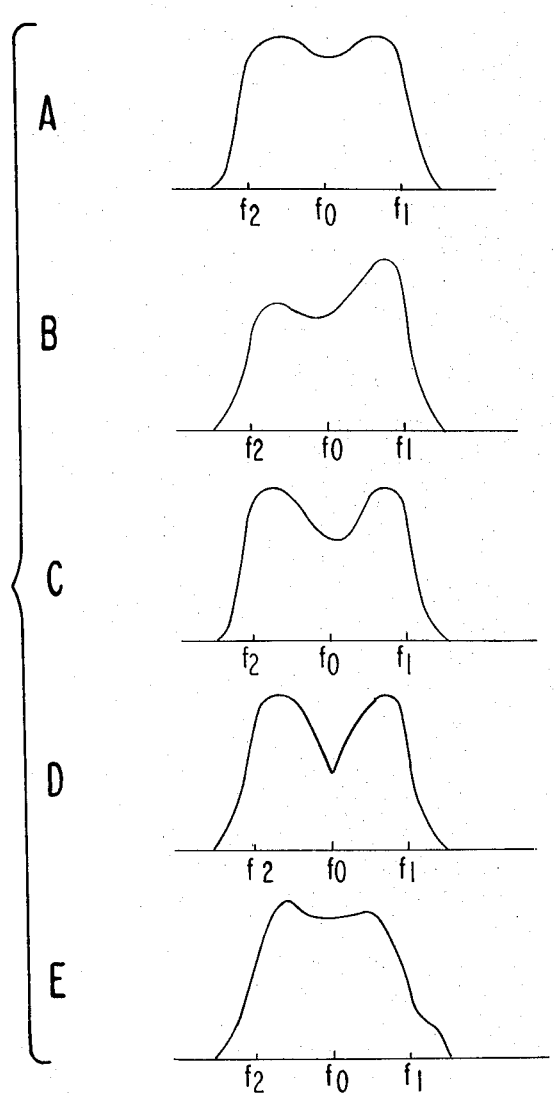
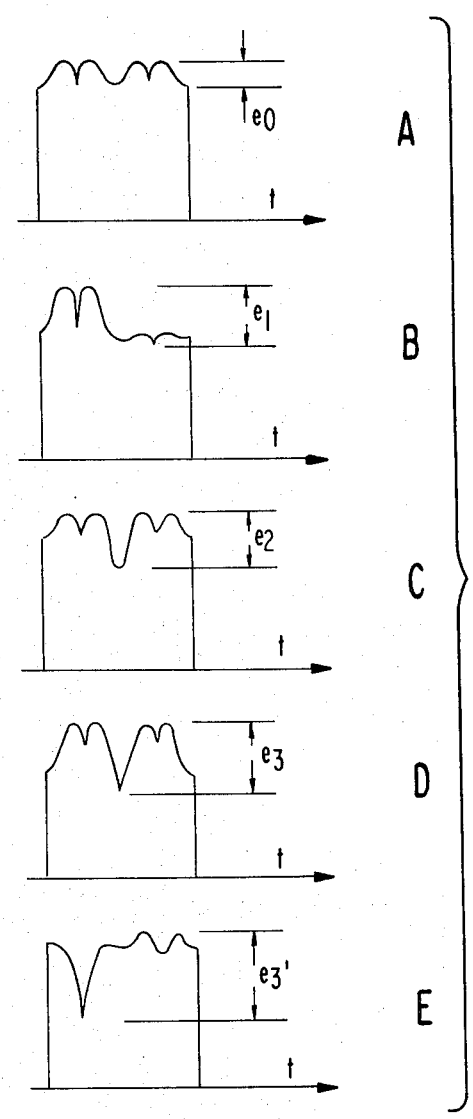
FIG. 10
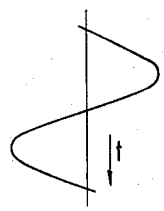
FIG. 4
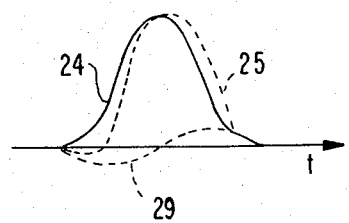

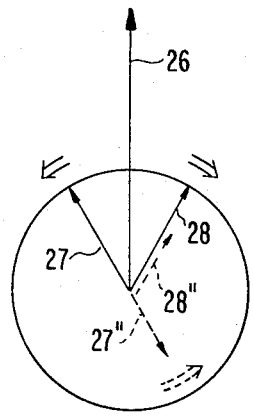
FIG.5A
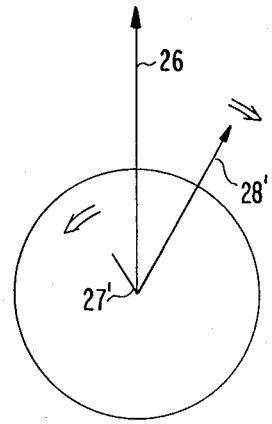
FIG.5B
FIG. 6
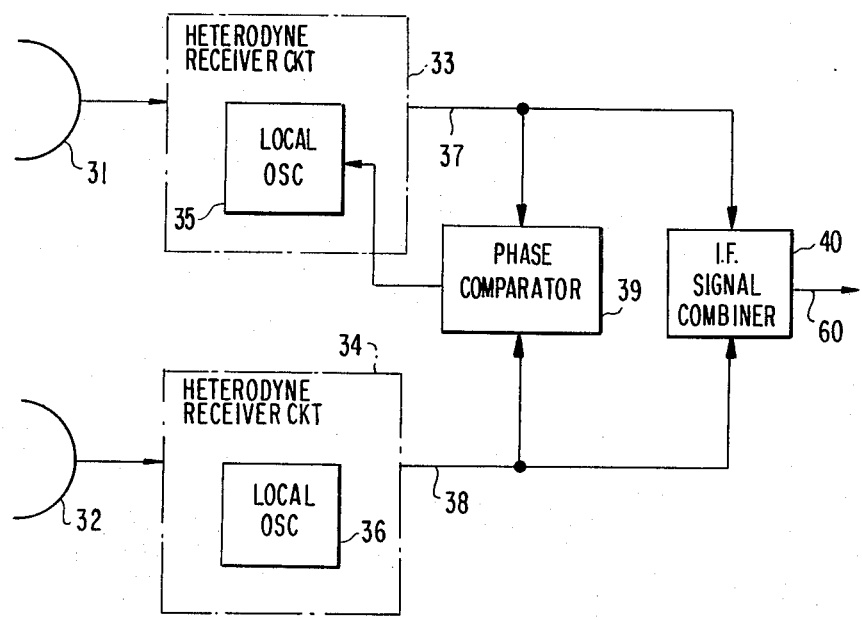

ns/ SPACE-DIVERSITY BROAD-BAND DIGITAL RADIO RECEIVER

BACKGROUND OF THE INVENTION

This invention relates to a space-diversity radio receiver in which a receiver output signal is produced after intermediate frequency signals derived from two or more signals received through different transmission paths are combined and which is for use in a broad-band digital radio communication system. The receiver is usable even when frequency diversity is combined with space diversity to provide hybrid diversity and in either a repeater station and a terminal station of the system.

In a microwave communication system in general, most distances between adjacent stations are from 30 to 50 kilometers long in view of economy of the system and because of convenience of site selection for the stations. Selective fading, to be described later in detail, often appears when the signals transmitted through the system are frequency modulated, particularly in case where the section is relatively long and extends either along an even topography or a seashore. Resulting from a multipath effect according to which a modulated carrier signal is received at a receiver through a direct path and at least one curved path variable with the atmosphere conditions, the selective fading deteriorates the transmission performance and, even worse, may result in interruption of communication.

Space diversity in which the modulated carrier signal is received by two or more antennas for a receiver as a plurality of receiver input signals, respectively, is effective in ensuring highly reliable communication in a section where the selective fading is liable to occur. This is because it is seldom that electric field intensities of the respective signals thus received through a plurality of transmission paths, each comprising a direct and a curved path, are simultaneously reduced to an objectionable extent. In order to derive a receiver output signal, the receiver comprises a combining circuit for the receiver input signals either in a carrier frequency stage or in an intermediate frequency stage. The signal combining circuit may be a switching combiner for combining the receiver input signals with that of the higher electric field intensity selected, a linear combiner, or a ratio squarer for minimizing the signal-to-noise ratio of the receiver output signal.

In a digital microwave communication system, the selective fading results in distortion of the modulated carrier signal waveform as will later be described with reference to a few of the figures of the accompanying drawing. This, in turn, gives rise to bit errors and deteriorates the bit error rate. In a 6-GHz FDM-FM (frequency division multiplexed-frequency modulated) communication system, the total duration of fading in a section was one hour per year. By adoption of diversity reception, the total duration was reduced to about one minute per year. This corresponds to an improvement factor of sixty. This great improvement factor is achieved because the effect of increase resulting in thermal noise from fading is more dominant than the waveform distortion in the FDM-FM system.

It has recently been confirmed that the bit error rate is more seriously deteriorated by the waveform distortion than by the effect of the thermal noise increment in a broad-band multilevel digital radio communication system, such as the PCM-8PSK (pulse code modulated-eight-level phase shift keying) system or the PCM-16QAM (quadrature amplitude modulation) system. For example, the improvement factor of the bit error rate is only six in a 78-Mbit/s 8PSK space diversity communication system according to an article contributed by William T. Barnett to IEEE Transactions on Communications, Vol. COM-27, No. 12 (December 1979), page 1842–1848, under the title of "Multipath Fading Effects on Digital Radio." The improvement factor is seven in a 200-Mbit/s 16QAM system according to another article contributed by Shozo Komaki et al to the same issue, pages 1854–1861, and entitled "Characteristics of a High Capacity 16 QAM Digital Radio System in Multipath Fading." The improvement factor is eighteen in a 91-Mbit/s QPRS (quadrature partial response signalling) system according to still another article contributed by Carl W. Anderson et al to the same issue, page 1870–1875, and entitled "The Effect of Selective Fading on Digital Radio."

The poor improvement factors hitherto attained, show the importance of getting rid of the waveform distortion in the space-diversity broad-band digital radio receiver. As suggested in the articles referred to hereinabove, the waveform distortion depends on an amplitude dispersion caused by the selective fading. No receivers, however, have been developed to reduce the amplitude dispersion.

SUMMARY OF THE INVENTION

It is therefore a principal object of the present invention to provide a space-diversity broad-band digital radio receiver, in which the amplitude dispersion caused by the selective fading is minimized to reduce the waveform distortion and the bit error rate.

It is a subordinate object of this invention to provide a space-diversity broad-band digital radio receiver of the type described, in which first-order and second-order dispersion components of the amplitude dispersion are minimized.

It is another subordinate object of this invention to provide a space-diversity broad-band digital radio receiver of the type described, wherein minimization is achieved not only for the first-order and the second-order dispersion components but also for a notch-shaped dispersion component that may be present in the amplitude dispersion and deteriorates the performance of a multilevel digital radio communication system as, for example, PCM-8PSK and PCM-16QAM systems.

A space-diversity broad-band digital radio receiver to which this invention is applicable, comprises first and second heterodyne receiver circuits for carrying out space-diversity heterodyne reception to produce a first and a second intermediate frequency signal, respectively. The first and the second intermediate frequency signals have frequencies variable in a common intermediate frequency band, an approximately zero average level difference, and an approximately zero phase difference. Each of the first and the second intermediate frequency signals may have an amplitude dispersion. The receiver comprises first amplitude dispersion detecting means for detecting the amplitude dispersion of the first intermediate frequency signal to produce a first output signal having a first amplitude variable with the detected amplitude dispersion, second amplitude dispersion detecting means for detecting the amplitude dispersion of the second intermediate frequency signal to produce a second output signal having a second amplitude variable with the amplitude dispersion of the second intermediate frequency signal, and combining means responsive to the first and the second output signals for combining the first and the second intermediate frequency signals to produce a combined intermediate frequency signal by suppressing that one of the first and the second intermediate frequency signals in which the amplitude dispersion is the greater.

BRIEF DESCRIPTION OF THE DRAWING

FIGS. 3 A through E show various frequency characteristics of an intermediate frequency signal as affected by selective fading;

FIG. 4 shows a pulse of a baseband demodulated digital signal;

FIGS. 5 A and B are vector diagrams for use in illustrating waveform distortion caused by the amplitude dispersion;

FIG. 6 is a block diagram of a space-diversity broadband digital radio receiver which includes an intermediate frequency signal combiner according to a first embodiment of the instant invention;

FIG. 10, illustrated below FIG. 3 E, shows a frequency characteristic of a variable frequency oscillator used in the intermediate frequency signal combiner illustrated in FIG. 9;

FIGS. 11 A through E, drawn on the right side of FIGS. 3 A through E, respectively, exemplify a beat output obtained in the intermediate frequency signal combiner illustrated in FIG. 9; FIG. 8, shows a frequency discrimination characteristic of a frequency discriminator for use in the intermediate frequency signal combiner depicted in FIG. 9.

DESCRIPTION OF THE PREFERRED EMBODIMENTS

Figure 1:
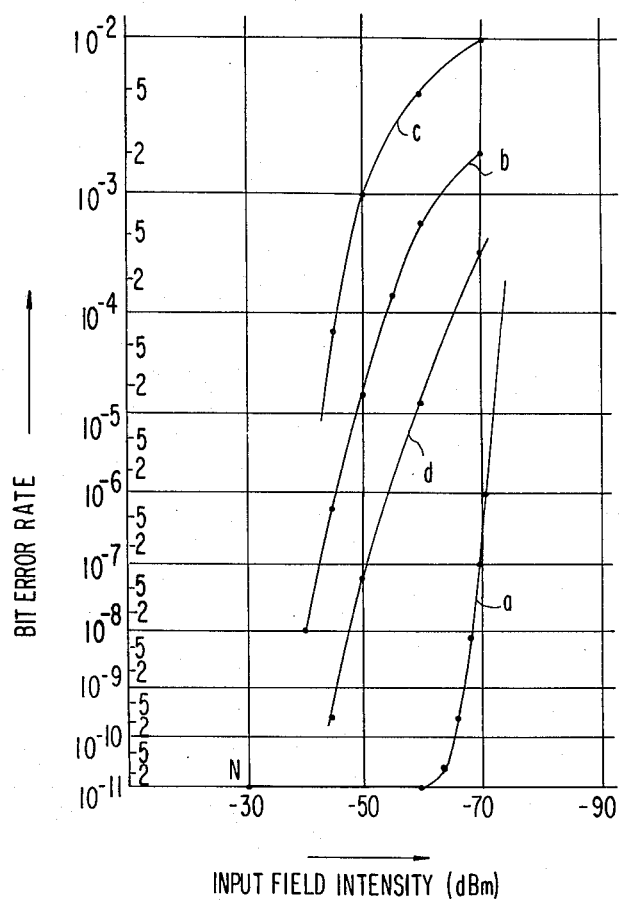
FIG. 1 shows bit error rates of a microwave digital communication system versus electric field intensities of receiver input signals.

Referring to FIG. 1, bit error rates will be described in connection with variations in electric field intensity of receiver input signals in order to facilitate an understanding of the present invention. An experimental study was started in August 1978 and continued one month and a half on a 70-km test link near Los Angeles, Calif., U.S.A., by the use of a 78-Mbit/s 6-GHz-band eight-phase phase modulation repeater system. In the absence of fading, the input electric field intensity was about $-30$ dBm and the bit error rate was not greater than $10^{-11}$ as indicated at a point N. The field intensity was purposely reduced by the use of a variable resistor attenuator. The bit error rate varied along a curve a. The bit error rate remained at about $10^{-11}$ before a reduction of the field intensity to $-60$ dBm and began to suddenly deteriorate when the field intensity was reduced to about $-68$ dBm. In the presence of actual fading, the bit error rates were adversely affected as exemplified by curves b, c, and d. The typical bit error rate was $10^{-5}$. Even with a reduction of about 20 dB in the field intensity, the bit error rates grew up to about $10^{-3}$ or $10^{-7}$. It was confirmed by the use of a spectrum analyser that the deterioration of the bit error rate resulted from selective fading.

Figure 2:
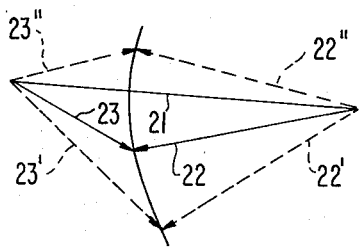
FIG. 2 is a vector diagram for use in illustrating the mechanism of production of an amplitude dispersion in a receiver input signal by selective fading.

Turning to FIG. 2, a receiver input signal affected by the multipath effect will be considered as a result of a direct signal received through a direct path and a delayed signal received with a certain delay through a curved path. The delay depends on the frequency. More particularly, a vector 21 represents the direct signal and another vector 22, a delayed signal of a center frequency. When composed, the direct and the delayed signals 21 and 22 give a receiver input signal 23 of the center frequency. As shown at 22', the delayed signal of a higher frequency lags behind (or leads) in phase the center frequency delayed signal 22 relative to the direct signal 21. The receiver input signal becomes stronger as depicted at 23'. The delayed signals of a lower frequency leads (or lags behind) the center frequency delayed signal as exemplified at 22''. The receiver input signal becomes weaker as shown at 23''. The frequency characteristic of the receiver input signal is thus rendered uneven by the multipath effect.

Referring to FIG. 3 A, an intermediate frequency signal derived from a receiver input signal in the absence of selective fading, has a substantially equal energy density at a center frequency $f_0$ of an intermediate frequency band and at upper and lower frequency edges $f_1$ and $f_2$ thereof. In other words, the energy of the center-frequency signal component is substantially equal to the energy of the upper-frequency or the lower-frequency edge signal component. The energy densities at the upper and the lower frequency edges $f_1$ and $f_2$ become either greater and smaller, as illustrated in FIG. 3 B, or smaller and greater than the energy density at the center frequency $f_0$ when the amplitude dispersion consists of a first-order dispersion component. The energy density at the center frequency $f_0$ becomes smaller, as shown in FIG. 3 C, or greater than the energy density at the upper or the lower frequency edge $f_1$ or $f_2$ when a second-order dispersion component is dominant in the amplitude dispersion. The spectrum of the receiver input signal has the same shapes as those of FIGS. 3A, 3B and 3C, respectively, when the amplitude dispersion is absent, consists of a first-order dispersion component, and comprises a second-order dispersion component. FIGS. 3 D and E will be described later.

Referring to FIG. 4, a solid-line curve 24 illustrates a pulse of a digital signal obtained as a receiver output signal in the absence of amplitude dispersion. A broken-line curve 25 shows a pulse into which the pulse 24 is distorted when the amplitude dispersion consists of a first-order dispersion component.

Turning to FIG. 5 A, it is possible to represent the pulse 24 as a result of a first vector 26 indicative of a d.c. component, a second vector 28 representative of the energy of a higher-frequency signal component, and a third vector 27 representative of the energy of a lower-frequency signal component. As indicated in FIG. 5 B at 28' and 27', the energy of the higher and the lower frequency signal components becomes greater and smaller, respectively, in the presence of the first-order dispersion component illustrated with reference to FIG. 3 B. This is equivalent in addition of vectors 27'' and 28'' to the vectors 27 and 28 depicted in FIG. 5 A, respectively, and to addition of orthogonal components 29 shown in FIG. 4 to the pulse 24. The pulse 24 is thus distorted into the pulse 25, which adversely affects the waveform of adjacent pulses (not shown) and the bit error rate. It is now understood that minimization of the amplitude dispersion in a certain frequency band is important in improving the bit error rate.

Referring now to FIG. 6, a space-diversity broadband digital radio receiver according to a first embodiment of this invention is for connection to main and space-diversity antennas 31 and 32 at which receiver input signals are obtained. The receiver comprises first and second heterodyne receiver circuits 33 and 34 comprising, in turn, local oscillators 35 and 36 which carry out space-diversity heterodyne reception of the respective receiver input signals to produce first and second intermediate frequency signals 37 and 38, respectively, with frequencies variable in a common intermediate frequency band such as, for example, a 70-MHz band. The heterodyne receiver circuits 33 and 34 comprise AGC circuits (not shown) for making the intermediate frequency signals 37 and 38 have an average level of about +4 dBm. In space diversity reception, the receiver input signals have frequencies variable simultaneously in a microwave frequency band. The selective fading, however, gives rise not only to an amplitude dispersion but also a phase difference at the center frequency of the microwave frequency band between the receiver input signals. A phase comparator 39 detects the phase difference in the intermediate frequency stage and controls one of the local oscillators, such as the oscillator 35, to keep the phase difference of the intermediate frequency signals 37 and 38 within ±5°. The intermediate frequency signals 37 and 38 therefore have an approximately zero average level difference and an approximately zero phase difference although they may have amplitude dispersions, respectively. The receiver further comprises an intermediate frequency signal combiner 40 for combining the first and the second intermediate frequency signals 37 and 38 with the amplitude dispersions minimized.

Figure 7:
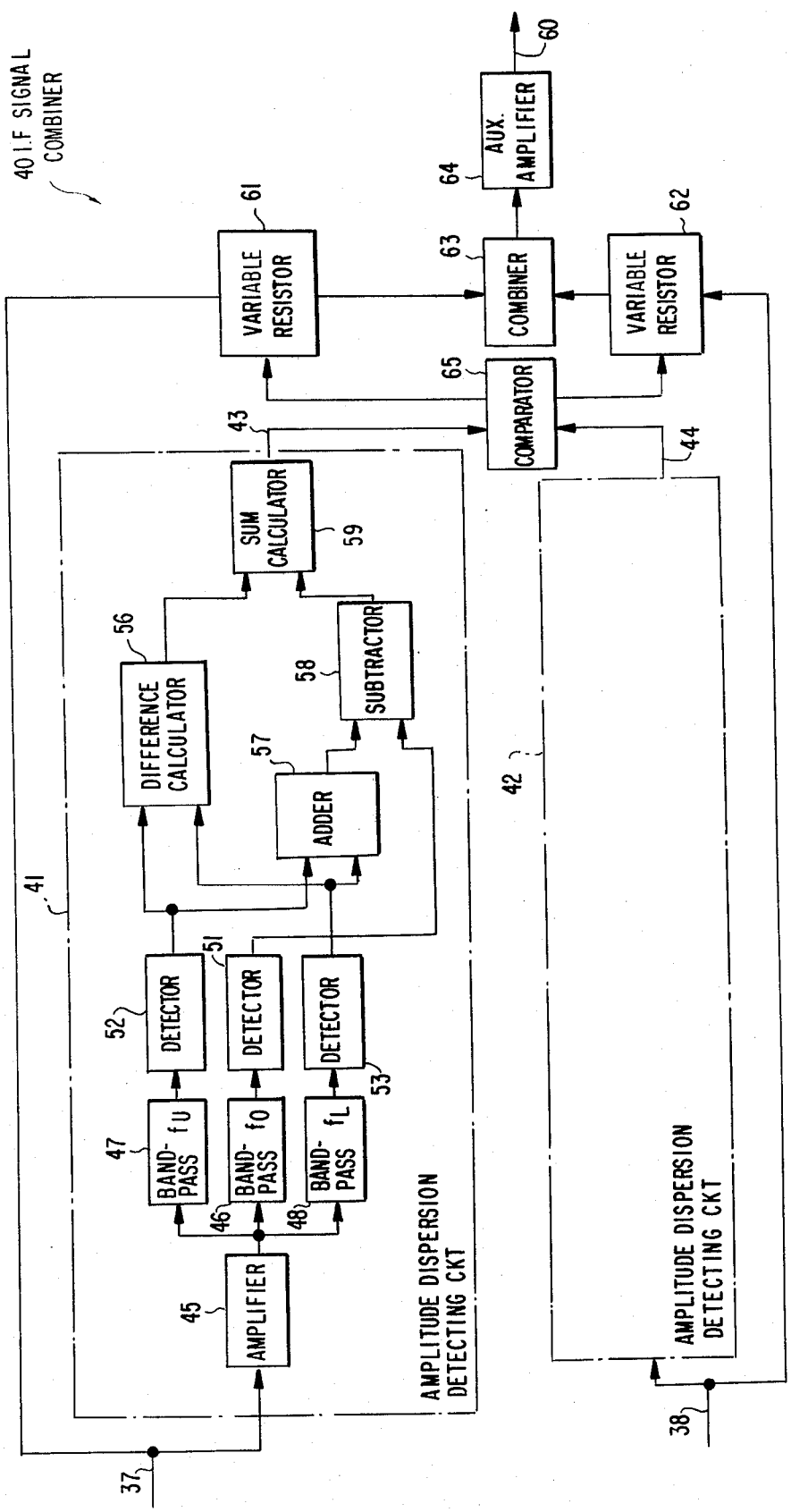
FIG. 7 is a block diagram of an intermediate frequency signal combiner for use in the receiver depicted in FIG. 6.

Referring to FIG. 7, an intermediate frequency signal combiner 40, for use in the receiver illustrated with reference to FIG. 6, comprises first and second amplitude dispersion detecting circuits 41 and 42 supplied with the first and the second intermediate frequency signals 37 and 38, respectively, for detecting the respective amplitude dispersions to produce first and second output signals 43 and 44, respectively. Each output signal 43 or 44 has a pertinent one of a first and a second amplitude variable with the detected amplitude dispersion as will become clear as the description proceeds.

It will now be presumed that the amplitude dispersion comprises a first-order and/or a second-order dispersion component. As depicted in the first amplitude dispersion detecting circuit 41, each amplitude dispersion detecting circuit 41 or 42 comprises a buffer amplifier 45 for the intermediate frequency signal 37 or 38 supplied thereto, a first-band-pass filter 46 responsive to the intermediate frequency signal supplied thereto through the amplifier 45 for producing a first filtered signal at a center frequency $f_0$ of the intermediate frequency band and the adjacency, a second band-pass filter 47 responsive to the intermediate frequency signal supplied thereto through the amplifier 45 for producing a second filtered signal at a higher frequency $f_U$ of the intermediate frequency band and its adjacency, and a third band-pass filter 48 responsive to the intermediate frequency signal supplied thereto through the amplifier 45 for producing a third filtered signal at a lower frequency $f_L$ of the intermediate frequency band and its adjacency. A first detector 51 is for detecting the first filtered signal to produce a first detected signal with a consequent or resultant level. A second detector 52 is for detecting the second filtered signal to produce a second detected signal with a level substantially equal to the consequent level when the first-order and the second-order dispersion components are zero. A third detector 53 is for detecting the third filtered signal to produce a third detected signal with a level substantially equal to the consequent level when the first-order and the second-order dispersion components are zero.

Each amplitude dispersion detecting circuit 41 or 42 further comprises a difference calculator 56 for calculating a difference between the levels of the second and the third detected signals. The difference calculator 56 serves as a first dispersion component calculating circuit for producing a first dispersion component signal having an amplitude variable in substantial proportion to the first-order dispersion component. An adder 57 is for calculating a sum of the second and the third detected signal levels to produce a sum signal having a level equal to a half of the sum of the second and the third detected signal levels. A subtractor 58 is for subtracting the first detected signal from the sum signal to produce an algebraic sum signal. The adder and the subtractor 57 and 58 serve as a second dispersion component calculating circuit for producing the algebraic sum signal as a second dispersion component signal having an amplitude variable in substantial proportion to the second-order dispersion component. A sum calculating circuit 59 is for calculating an arithmetic sum of the amplitudes of the first and the second dispersion component signals to produce the pertinent one of the first and the second output signals 43 and 44 with an amplitude variable with the arithmetic sum.

When the intermediate frequency signal 37 or 38 supplied to the buffer amplifier 45 has no first-order and second-order dispersion components, the first and the second dispersion component signals have zero amplitude because the first through the third detected signals have the substantially equal level. When the amplitude dispersion consists only of the first-order dispersion component, only the first dispersion component signal has an appreciable amplitude as would be clear from FIGS. 3 B and C. When the second-order dispersion component is dominant, the second dispersion component signal is given a significant amplitude.

It is now understood that each amplitude dispersion detecting circuit 41 or 42 comprises a first circuit responsive to the intermediate signal 37 or 38 supplied thereto for detecting the amplitude dispersion at three different narrow bands in the intermediate frequency band to produce three output signals having levels dependent on energies which the intermediate frequency signal under consideration 37 or 38 has at the three narrow bands, respectively. The levels of the three output signals should be substantially equal to one another when the amplitude dispersion of the intermediate frequency signal in question 37 or 38 is zero. The amplitude dispersion detecting circuit 41 or 42 further comprises a second circuit for calculating an algebraic sum of the levels of the three output signals to produce the pertinent one of the first and the second output signals 43 and 44 with the amplitude thereof rendered variable with a sum of those amplitude variations which result in the pertinent output signal 43 or 44 from the first-order and the second-order dispersion components, respectively.

It is now possible to make a signal combining circuit produce a combined intermediate frequency signal 60 by suppressing that one of the first and the second intermediate frequency signals 37 and 38 in which the amplitude dispersion is the greater. With this, the bit error rate is unexpectedly improved. Such a signal combining circuit may be any one of known ones, such as a switching combiner, a linear combiner, and a ratio squarer.

In FIG. 7, a linear combiner is exemplified. First and second variable resistors 61 and 62 are used to suppress the first and the second intermediate frequency signals 37 and 38 in response to a first and a second control signal, respectively. The suppressed intermediate frequency signals are combined by a combiner 63 for producing a combiner output signal, which is amplified by an auxiliary amplifier 64 for producing the combined intermediate frequency signal 60. A comparator 65 is for comparing the amplitudes of the first and the second dispersion component signals for controlling the respective variable resistors 61 and 62 so that the combiner output signal may have a constant average level irrespective of suppression of the first and the second intermediate frequency signals 37 and 38.

Referring back to FIGS. 3 D and E, the amplitude dispersion comprises a notch-shaped dispersion component at the center frequency $f_0$ and near the upper frequency edge $f_1$ of the intermediate frequency band, respectively. A similar notch-shaped dispersion component may appear at any other frequency, such as near the lower frequency edge. Such a notch-shaped dispersion component appears when the direct and the delayed signals have an approximately equal electric field intensity and seriously deteriorates the performance of a broad-band multilevel radio communication system, such as a PCM-8PSK or a PCM-16QAM system. The amplitude dispersion detecting circuits 41 and 42 illustrated with reference to FIG. 7 are insufficient in detecting the notch-shaped dispersion component, particularly when the notch-shaped dispersion component has a steep slope.

Figure 8:
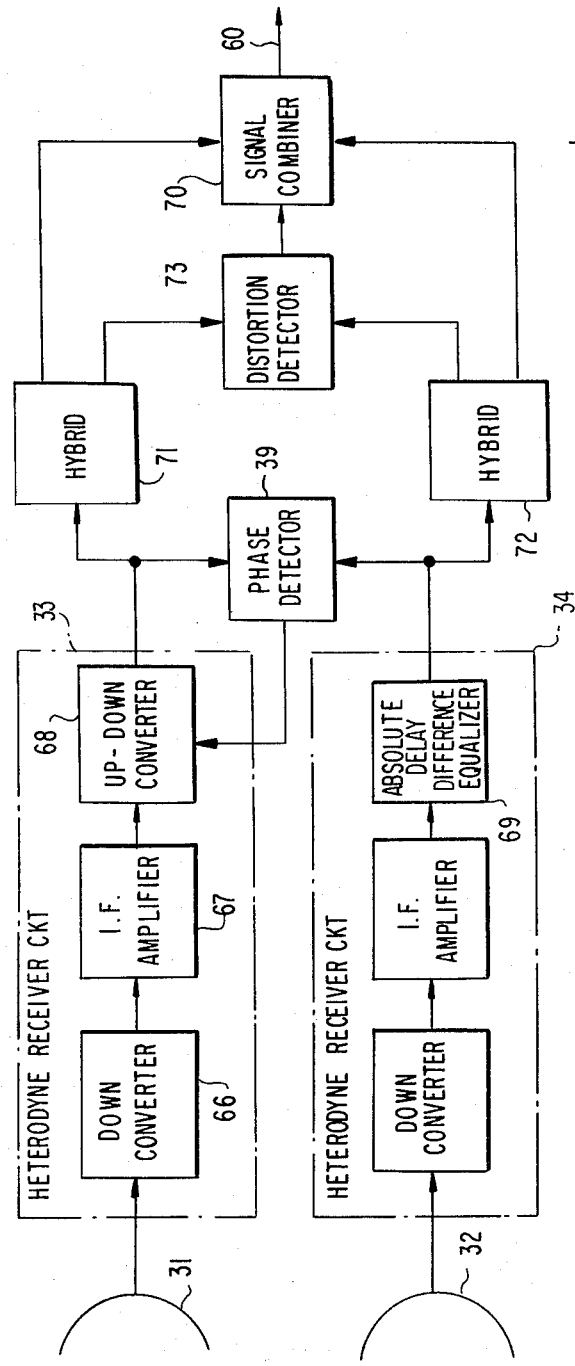
FIG. 8 is a block diagram of a hybrid-diversity broadband digital radio receiver according to a second embodiment of this invention.

Referring now to FIG. 8, a broad-band digital radio receiver according to a second embodiment of this invention is for use in a hybrid-diversity communication system, which can be deemed to be a space-diversity communication system of a sort. The receiver is for connection to main and space-diversity antennas 31 and 32 of the type described in connection with FIG. 6 and comprises first and second heterodyne receiver circuits 33 and 34 for producing first and second intermediate frequency signals 37 and 38. Each of the heterodyne receiver circuits 33 and 34 comprises a down converter 66 and a main intermediate frequency amplifier 67. The amplifier 67 and its equivalent in the first and the second heterodyne receiver circuits 33 and 34 are for producing a first and a second intermediate frequency output, respectively. When the receiver input signals are subjected to no fading, the first and the second intermediate frequency outputs have the same modulation spectrum and the same output level. The intermediate frequency outputs, however, have a small frequency difference when subjected to no modulation.

The first heterodyne receiver circuit 33 comprises a controllable up-down converter 68 for up-converting and then down-converting the first intermediate frequency output, as from a 70-MHz band up to a 180-MHz band and then down again to the 70-MHz band, to produce the first intermediate frequency signal 37. The second heterodyne receiver circuit 34 comprises an absolute delay difference equalizer 69 for producing the second intermediate frequency signal 38 with the absolute delay difference relative to the first intermediate frequency signal 37 rendered zero. The equalizer 69 is a coaxial cable for time delay such as the DADE cable shown in FIG. 1 of the aforementioned William T. Barnett article. As in the receiver illustrated with reference to FIG. 6, a phase detector 39 detects the phase difference between the intermediate frequency signals 37 and 38 and controls the frequency and the phase of one of two local oscillators (not shown) of the up-down converter 68. With this, it is possible to make the intermediate frequency signals 37 and 38 have frequencies variable in a common intermediate frequency band, an approximately zero average level difference, and an approximately zero phase difference even in the presence of fading of from 0 to 40 dB.

The receiver further comprises a signal combining circuit 70 for combining the first and the second intermediate frequency signals 37 and 38 supplied thereto through first and second hybrid circuits 71 and 72, respectively, to produce a combined intermediate frequency signal 60 with that one of the signals 37 and 38 suppressed in which the amplitude dispersion is the greater. A distortion detector 73 comprising first and second amplitude dispersion detecting circuits 41 and 42 (FIG. 7 or 9) for detecting the amplitude dispersion of the respective intermediate frequency signals 37 and 38 supplied thereto through the hybrid circuits 71 and 72 and for controlling the combining circuit 70 as described. The hybrid circuits 71 and 72 split or divide the signals 37 and 38 into two, respectively. The combining circuit 70 and the amplitude dispersion detecting circuits 41 and 42 serve as the intermediate frequency signal combiner 40 described in conjunction with FIG. 6.

Figure 9:
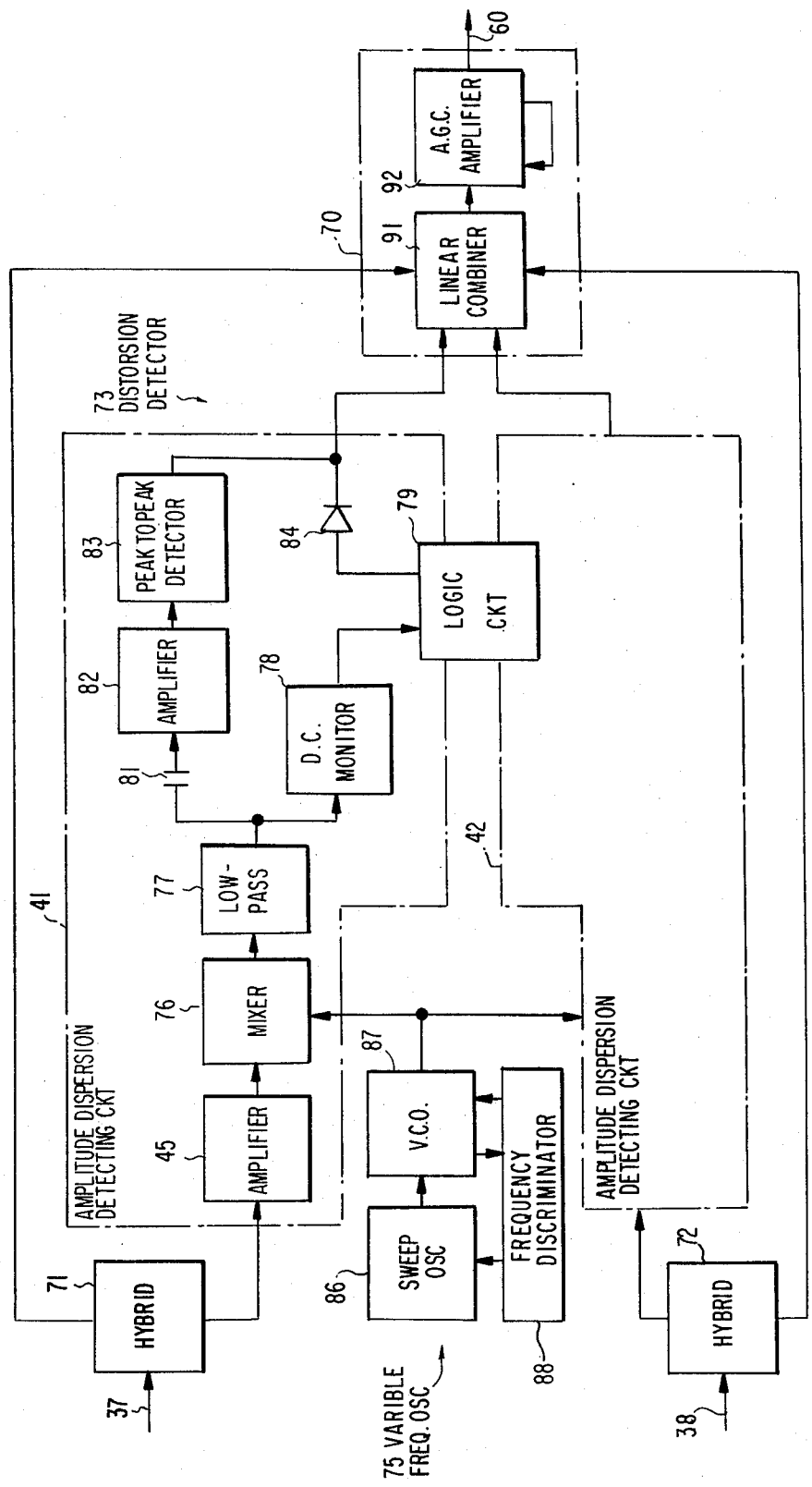
FIG. 9 is a block diagram of an intermediate frequency signal combiner for use in the receiver shown in FIG. 8.

Referring to FIG. 9, the distortion detector 73 comprises a frequency variable narrow band-pass filter to be presently described in detail. The variable band-pass filter has a passband variable substantially throughout the intermediate frequency band at a lower frequency lower than the intermediate frequency band. By detecting the energy of the first intermediate frequency signal 37 at the variable passband, the band-pass filter detects the amplitude dispersion of the intermediate frequency signal under consideration 37 and produces a beat output comprising a d.c. and a ripple component. Likewise, the band-pass filter produces a similar beat output in response to the second intermediate frequency signal 38.

Turning to FIG. 10 and FIGS. 11 A through E, let the passband be represented by a single line and variable along a sine curve depicted in FIG. 10. When no amplitude dispersion is present, the output voltage of the variable frequency narrow band-pass filter has only a small ripple component $e_0$ superposed on the d.c. component as exemplified in FIG. 11 A. When the first-order and the second-order dispersion components are dominant, the output voltages have appreciable ripple components $e_1$ and $e_2$, respectively. In the presence of a notch-shaped dispersion component, the ripple component becomes greater relative to the d.c. component as exemplified in FIGS. 11 D and E at $e_3$ and $e_3'$.

Referring more specifically to FIG. 9, the first and the second amplitude dispersion detecting circuits 41 and 42 are accompanied in common by a variable frequency oscillator 75 for generating an oscillatory output of a frequency repeatedly variable at the lower frequency as exemplified in FIG. 10. As described in connection with FIG. 7, each amplitude dispersion detecting circuit 41 or 42 comprises a buffer amplifier 45. In combination with the variable frequency oscillator 75, the variable frequency narrow band-pass filter in each amplitude dispersion detecting circuit 41 or 42 is implemented by a series connection of a mixer 76 and a low-pass filter 77. The mixer 76 is for mixing the intermediate frequency signal 37 or 38 supplied thereto through the hybrid circuit 71 or 72 and the amplifier 45 and the oscillatory output to produce a mixed signal. Responsive to the mixed signal, the low-pass filter 77 produces a relevant one of the beat outputs.

The d.c. components of the respective beat outputs are indicative of the receiver input signal field intensities. When either of the receiver input signals is cancelled by fading, both the d.c. and the ripple components become zero in the relevant one of the beat outputs. Each amplitude dispersion detecting circuit 41 or 42 therefore comprises a d.c. monitor 78 for monitoring the beat output to produce the d.c. component thereof as a monitor output and a logic circuit 79 responsive to the monitor output for producing a d.c. output only when the d.c. component has a level exceeding a prescribed level. In FIG. 9, the logic circuit 79 and its equivalent in the first and the second amplitude dispersion detecting circuits 41 and 42 are depicted as a single rectangular box.

Each amplitude dispersion detecting circuit 41 or 42 further comprises a capacitor 81 for allowing passage therethrough of the ripple component of the beat output, an amplifier 82 for amplifying the ripple component, and a peak-to-peak detector 83 responsive to the amplified ripple component for producing a detector output representative of the peak-to-peak value of the ripple component, such as $e_0$, $e_1$, $e_2$, $e_3$, or $e_3'$. A coupling diode 84 is rendered open by the d.c. output to produce the detector output as a pertinent one of first and second output signals 43 and 44 of the type described in connection with FIG. 7.

It is now understood that each amplitude dispersion detecting circuit 41 or 42 comprises a first circuit responsive to the intermediate frequency signal 37 or 38 supplied thereto and the oscillatory output for producing a beat output comprising a d.c. and a ripple component. The ripple component has an amplitude variation, such as $e_0$ or the like, dependent on the first-order, the second-order, and the notch-shaped dispersion components. The circuit 41 or 42 further comprises a second circuit responsive to the beat output for producing a d.c. output only when the d.c. component has a level exceeding a prescribed level, and a third circuit responsive to the d.c. output and the beat output for producing the pertinent output signal 43 or 44 only in the presence of the d.c. output. The second circuits in the respective amplitude dispersion detecting circuits 41 and 42 are for preventing production of the output signals 43 and 44 when the respective receiver input signals are cancelled by fading.

The variable frequency oscillator 75 may comprise a sweep oscillator 86 for generating a sweep oscillation having a voltage variable at the lower frequency and a voltage controlled oscillator 87 for generating the oscillatory output. A frequency discriminator 88 is connected to the voltage controlled oscillator 87 to control the oscillator 87 so that the frequency of the oscillatory output is variable as described.

Figure 12:
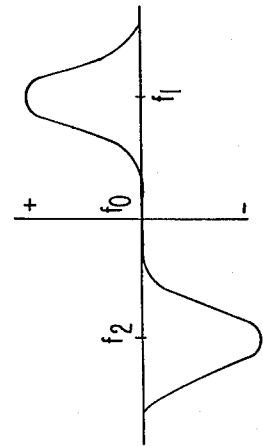
FIG. 12, depicted below

Turning to FIG. 12, it is sufficient that the frequency discriminator 88 has a frequency discrimination characteristic exemplified therein. By detecting either of frequency discriminator output peaks, it is possible to monitor whether or not the frequency variation of the oscillatory output is suitable. Furthermore, it is possible to prevent excessive frequency variation of the voltage controlled oscillator 87 by feeding the detected frequency discriminator output peaks back to the sweep oscillator 86.

Further referring to FIG. 9, the signal combining circuit 70 may comprise a linear combiner 91, similar to the combiner 40 described in connection with FIG. 7, for combining the first and the second intermediate frequency signals 37 and 38 with reference to the first and the second output signals 43 and 44. More particularly, the first and the second intermediate frequency signals 37 and 38 are combined into a combined signal with each signal 37 or 38 attenuated by 3 dB when the first and the second output signals 43 and 44 show absence of selective fading. When one of the intermediate frequency signals 37 and 38 is more seriously subjected to selective fading than the other, the signals 37 and 38 are combined into the combined signal with the other signal 37 or 38 given an attenuation of 0 dB and with the more seriously faded signal 38 or 37 strongly attenuated by the respective output signals 43 and 44. It is, however, difficult to make the combined signal have a constant level. A simple AGC'ed amplifier 92 is therefore used to keep an output thereof at a constant level. The AGC'ed amplifier output serves as the combined intermediate frequency signal 60.

As would have been understood from FIGS. 3 and 11, it is preferred that the frequency of the oscillatory output be variable substantially symmetrically with respect to the center frequency $f_0$. The symmetry is, however, immaterial.

What is claimed is:

1. A space-diversity broad-band digital radio receiver comprising:

first and second heterodyne receiver circuits for carrying out space-diversity heterodyne reception to produce a first and a second intermediate frequency signal, respectively, said first and said second intermediate frequency signals having frequencies variable in a common intermediate frequency band, an approximately zero average level difference, and an approximately zero phase difference, each of said first and said second intermediate frequency signals being capable of having an amplitude dispersion;

first amplitude versus frequency dispersion detecting means for detecting the amplitude versus frequency dispersion of said first intermediate frequency signal to produce a first output signal having a first amplitude variable with the detected amplitude versus frequency dispersion;

second amplitude versus frequency dispersion detecting means for detecting the amplitude versus frequency dispersion of said second intermediate frequency signal to produce a second output signal having a second amplitude variable with the amplitude versus frequency dispersion of said second intermediate frequency signal; and combining means responsive to said first and said second output signals for combining said first and said second intermediate frequency signals to produce a combined intermediate frequency signal by suppressing that one of said first and said second intermediate frequency signals in which the amplitude versus frequency dispersion is the greater.

2. A space-diversity broad-band digital radio receiver as claimed in claim 1, the amplitude dispersion of each of said first and said second intermediate frequency signals comprising a first-order and a second-order dispersion component, wherein each of said first and said second amplitude versus frequency dispersion detecting means comprises:

first means responsive to the intermediate frequency signal supplied thereto for detecting the amplitude dispersion at three different narrow bands in said intermediate frequency band to produce three output signals having levels dependent on energies which the intermediate frequency signal under consideration has at said three narrow bands, respectively, the levels of said three output signals being substantially equal to one another when the amplitude dispersion of the intermediate frequency signal in question is zero; and second means for calculating an algebraic sum of the levels of said three output signals to produce a pertinent one of said first and said second output signals with the amplitude thereof rendered variable with a sum of amplitude variations which result in said pertinent output signal from said first-order and said second-order dispersion components, respectively.

3. A space-diversity broad-band digital radio receiver as claimed in claim 2, wherein:

said first means comprises:

a first band-pass filter responsive to the intermediate frequency signal supplied thereto for producing a first filtered signal at a center frequency band of said intermediate frequency band;

a first detector for detecting said first filtered signal to produce a first of said three output signals with a consequent level;

a second band-pass filter responsive to the intermediate frequency signal supplied thereto for producing a second filtered signal at a higher frequency band of said intermediate frequency band;

a second detector for detecting said second filtered signal to produce a second of said three output signals with a level substantially equal to said consequent level when said first-order and said second-order dispersion components are zero;

a third band-pass filter responsive to the intermediate frequency signal supplied thereto for producing a third filtered signal at a lower frequency band of said intermediate frequency band; and a third detector for detecting said third filtered signal to produce a third of said three output signals with a level substantially equal to said consequent level when said first-order and said second-order dispersion components are zero;

said second means comprising:

a first dispersion component calculating circuit for calculating a difference between the levels of the second and the third of said three output signals to produce a first dispersion component signal having an amplitude variable in substantial proportion to said first-order dispersion component;

a second dispersion component calculating circuit for calculating an algebraic sum equivalent to an arithmetic sum of the levels of the second and the third of said three output signals less twice the level of the first of said three output signals to produce a second dispersion component signal having an amplitude variable in substantial proportion to said second-order dispersion component; and a sum calculating circuit for calculating a sum of the amplitudes of said first and said second dispersion component signals to produce the pertinent one of said first and said second output signals.

4. A space-diversity broad-band digital radio receiver as claimed in claim 1, the amplitude versus frequency dispersion of each of said first and second intermediate frequency signals comprising a notch-shaped dispersion component, wherein:

said first and said second amplitude versus frequency dispersion detecting means comprises a variable frequency oscillator in common, said variable frequency oscillator being for generating an oscillatory output of a frequency repeatedly variable substantially throughout said intermediate frequency band at a lower frequency lower than said intermediate frequency band;

each of said first and said second amplitude versus frequency dispersion detecting means comprising:

first means responsive to the intermediate frequency signal supplied thereto and said oscillatory output for producing a beat output comprising a d.c. and a ripple component, said ripple component having an amplitude variation dependent on said notch-shaped dispersion component;

second means responsive to said beat output for producing a d.c. output only when said d.c. component has a level exceeding a prescribed level; and third means responsive to said d.c. output and said beat output for producing a pertinent one of said first and said second output signals only in the presence of said d.c. output.

5. A space-diversity broad-band digital radio receiver as claimed in claim 4, wherein said first means comprises:

a mixer for mixing the intermediate frequency signal supplied thereto and said oscillatory output to produce a mixer output signal comprising a higher and a lower frequency component; and a low-pass filter for suppressing said higher frequency component to produce said lower frequency component as said best output.

6. A space-diversity broad-band digital radio receiver as claimed in claim 5, wherein said variable frequency oscillator comprises:

sweep oscillation generating means for generating a sweep oscillation having a voltage variable at said lower frequency; and a voltage controlled oscillator controlled by said sweep oscillation for generating said oscillatory output.

7. A space-diversity broad-band digital radio receiver as claimed in claims 5 or 6, wherein:

said second means comprises:

a d.c. monitor responsive to said beat output for producing said d.c. component as a monitor output; and a logic circuit responsive to said monitor output for producing said d.c. output;

said third means comprising:

a capacitor responsive to said beat output for producing said ripple component as a capacitor output;

a peak-to-peak detector responsive to said capacitor output for producing a detector output representative of said amplitude versus frequency variation; and a coupling diode rendered open by said d.c. output and supplied with said detector output for producing said detector output as the pertinent one of said first and said second output signals.

* * * * *

UNITED STATES PATENT AND TRADEMARK OFFICE
CERTIFICATE OF CORRECTION

PATENT NO.  : 4,384,358
DATED       : May 17, 1983
INVENTOR(S) : Shiki et al

It is certified that error appears in the above-identified patent and that said Letters Patent is hereby corrected as shown below:

Column 1 - line 27, delete "atmosphere" insert --atmospheric--;

Column 12 - line 48, delete "best" insert --beat--.

Signed and Sealed this

Twenty-fifth Day of September 1984

[SEAL]

Attest:

GERALD J. MOSSINGHOFF

Attesting Officer     Commissioner of Patents and Trademarks